United States Patent

Sabatino

[15] 3,643,834
[45] Feb. 22, 1972

[54] ACID DISPENSERS FOR DRY-CHARGED BATTERIES

[72] Inventor: Anthony Sabatino, St. Paul, Minn.
[73] Assignee: Gould Inc., St. Paul, Minn.
[22] Filed: Nov. 24, 1969
[21] Appl. No.: 879,359

[52] U.S. Cl. ............................ 222/54, 136/90, 136/114
[51] Int. Cl. ............................................ B67d 5/08
[58] Field of Search .................... 222/54, 542, 5; 206/2; 136/112, 113, 114, 90, 91, 92; 137/67

[56] References Cited

UNITED STATES PATENTS

| | | | |
|---|---|---|---|
| 2,786,599 | 3/1957 | Higbee | 222/54 X |
| 2,847,494 | 8/1958 | Jeannin | 136/114 X |
| 3,525,639 | 8/1970 | Redmon | 136/114 X |
| 3,540,939 | 11/1970 | Badger et al. | 136/181 X |

Primary Examiner—Robert B. Reeves
Assistant Examiner—Francis J. Bartuska
Attorney—Stryker and Jacobson

[57] ABSTRACT

An acid dispenser with a perforated tube mixing channel and two openings each of which is sealed by means of a rubber gasket held in place by a water-soluble pellet. The dispenser is placed inside a battery. When water is added to the battery the pellet dissolves releasing the gasket and allowing the acid within the container to mix with the water in the channel and in the battery.

11 Claims, 5 Drawing Figures

INVENTOR
ANTHONY SABATINO

ACID DISPENSERS FOR DRY-CHARGED BATTERIES

BACKGROUND OF THE INVENTION

There are two common types of lead acid storage batteries in use today. The first type is the wet-charged battery. Because this type of battery is stored with an aqueous sulfuric acid electrolyte in contact with the plates it slowly loses its charge and must be periodically recharged. This type of battery is also known to have a shorter service life due to corrosion and sulphation of the plates during storage. In order to avoid these disadvantages, dry-charged batteries have been developed.

Dry-charged batteries are stored without the electrolyte and are activated by the addition of acid or water. Since it is burdensome to handle acid separately the water-activated type of battery is preferred. Two general methods have been employed for constructing water activated batteries. The first involves placing a container for the acid inside the battery compartment. The container is punctured or ruptured after the addition of water. Such containers have proven to be unsuitable for commercial use due to the difficulty involved in controllably opening the container. A further disadvantage experienced is that a great deal of boiling and hissing may be experienced upon the sudden mixing of the acid and water when the container is broken open. Still another disadvantage involves the possibility of permanent damage to the plates by the concentrated sulfuric acid should the container accidentally be ruptured before water is added. To avoid these problems a second approach has been utilized which involves immobilizing the acid by mixing it with a gel or other substance suitable to absorb the acid and maintain it out of contact with the battery plates. The problem with gels is that they frequently require a large proportion of inactive gelling agent which is still present when the battery is subsequently activated. In many cases this gelling agent does not dissolve in the electrolyte and leaves a residue which impedes the operation of the battery. It has also been found that some gelling agents introduce soluble ingredients which have a deleterious effect on battery performance. Another problem experienced with immobilized electrolytes involves a tendency for the gel to exude liquid during storage. This phenomenon is commonly called synersis. The exuded droplets of acid may contact the plates and corrode them so as to cause a premature failure of the battery. My invention contemplates a new type of acid containing slow release container which avoids all of the above mentioned problems.

SUMMARY OF THE INVENTION

The present invention involves a method for controllably opening an acid container. Each opening in the container is adapted to be closed by means of an acid-resistant pliable gasket which is in turn held in place by a water-soluble plug. A screwcap or other suitable closure means is mounted over the container opening so as to hold the plug in place. Holes are provided in the cap to allow water to enter and dissolve the plug. Once the plug has disintegrated the gasket is free to fall away and the water enters a perforated tube or channel disposed in the acid in the container by means of the holes in the cap. As will be more apparent from the detailed description several variations of my invention are possible including means for mounting the gasket in such a way as to be pulled clear of the opening upon the disintegration of the water-soluble plug. Thus, it is an object of my invention to provide an improved liquid-triggered dispenser. It is another object of my invention to provide an provide an improved water-activated acid dispenser for dry charged batteries. Further objects and advantages will become apparent to those skilled in the art upon consideration of the following description and drawings.

DESCRIPTION OF THE PREFERRED EMBODIMENT

Figure 1:
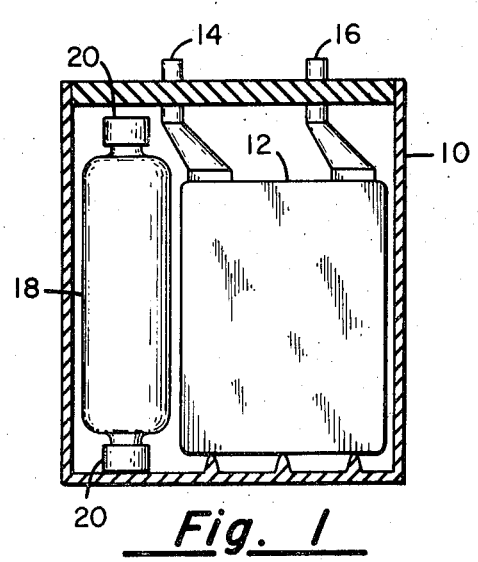
FIG. 1 is a schematic diagram of a typical dry charge battery with an acid container positioned therein.

In FIG. 1 a typical dry-charged battery is shown. A housing 10 is used to enclose a plurality of plates 12 which are connected to a pair of terminals 14 and 16. Space is provided somewhere in the battery for an acid container 18. In the particular configuration shown the acid container is shown positioned on the left in a compartment provided expressly for the purpose. Container 18 is capped by a pair of screw-type closures 20 whose operation is more readily understood with reference to FIGS. 2 through 5.

Figure 2:
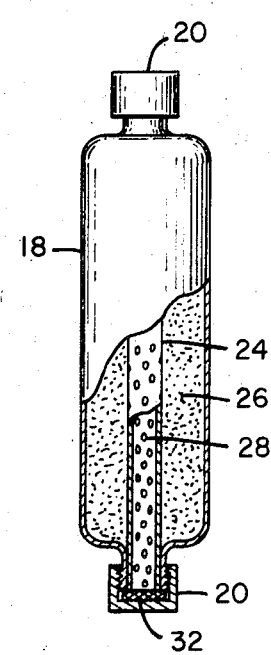
FIG. 2 shows a partially cut away enlarged view of the acid container contemplated by my invention.

In FIG. 2 a partially cutaway view of container 18 is presented. Container 18 may be formed from any acid resistant material. In the preferred embodiment a plastic container is contemplated. Threaded openings are incorporated into each end of container 18 which openings are adapted to receive two threaded closures or caps 20. In order to ensure a slow release of the dry acid 26 a perforated pipe 24 is inserted into container 18 extending from one opening to the other. Perforated pipe 24 provides a large surface area over which the water can contact the acid and permits a slow gentle mixing of the acid and water within pipe 24 upon the dissolving of a plug or pellet 32. Thus, no sudden localized boiling or reaction is experienced which spatters acid on the plates. Instead the preliminary mixing takes place in pipe 24 and plates 12 are protected. Pipe 24 may be constructed from polypropylene or any other acid resistant substance which can be made permeable to water. To better understand how pellet 32 operates to release the acid, reference should be had to FIG. 3.

Figure 3:
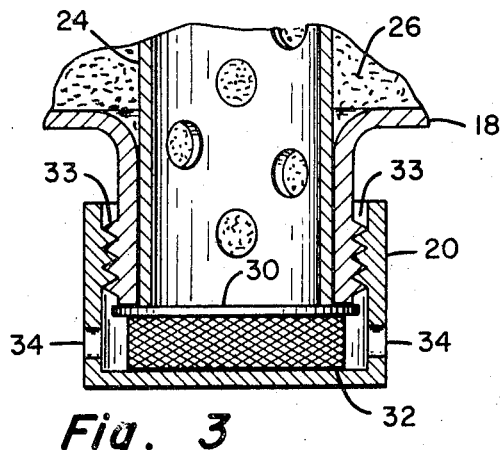
FIGS. 3, 4 and 5 are enlarged sectional diagrams of the openings to the acid container, each showing a possible variation of the present invention.

In FIG. 3 an enlarged sectional view of one of the threaded openings of container 18 is shown. A thin gasket or sealing means 30 is used to close off the end of pipe 24 and the threaded opening. Gasket 30 may be constructed of rubber or any other pliable acid-resistant material. Gasket 30 is supported by a water-soluble plug or pellet 32 which is positioned against the end of the threaded opening and over gasket or sealing means 30. Plug 32 is held in place by cap 20 which is fastened to container 18 by means of a set of threads 33. Cap 20 maybe constructed of any suitable material although plastic is contemplated by my invention. A number of holes are formed in cap 20 exemplified in FIG. 3 by a pair of holes 34. When battery housing 10 is filled with water the water enters holes 34 and comes into contact with dissolvable plug 32. Many chemical compositions may be used to form plug 32. For example, plug 32 may be made from sodium carbonate or a number of combinations of acid salts and carbonates which effervesce and dissolve rapidly in the presence of water.

When plug 32 has dissolved, gasket 30 drops away from the opening allowing the acid 26 to exit the container through holes 34. The mixing of the acid and water thus takes place in pipe 24 at a controlled moderate rate. Furthermore the mixing begins a short time after the battery has been filled and reclosed. Thus, any small emission of gases caused by the mixing is contained first by pipe 24 and then by the closed battery and does not present a safety hazard to the person filling the battery with water. The simplified embodiment of FIG. 3 does permit the possibility of the gasket failing to drop away especially if the apparatus is in the reverse upright position. My invention contemplates several additional variations in which the release of sealing means 30 is ensured.

Figure 4:
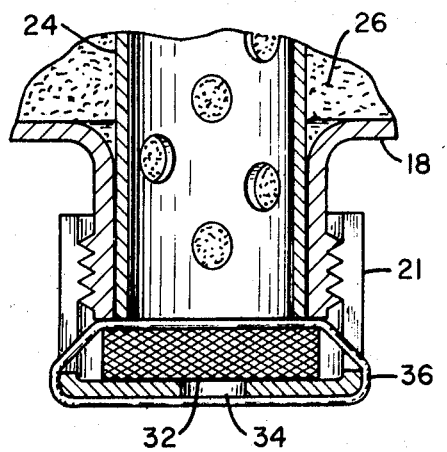

In FIG. 4 a mechanism similar to that of FIG. 3 is shown with certain modifications. Sealing means or gasket 30 has been replaced by a stretched loop of rubber 36 which forms both the sealing means for bottle 18 and a tension device designed to ensure the release of acid 26. In the embodiment of FIG. 4, when plus 32 dissolves, loop 36 contracts to a position clear of the opening in bottle 18. Thus, the gasket portion cannot possibly block the opening as would be a possibility in the embodiment of FIG. 3. Cap 21 in FIG. 4 is different from cap 20 in FIG. 3 in that a pair of slots are formed in cap 21 so that rubber loop 36 may be wrapped about plug 32 and the top of cap 21. It should also be noticed that water entry holes 34 are placed on the top of cap 21 in addition to the slots on the sides.

Figure 5:
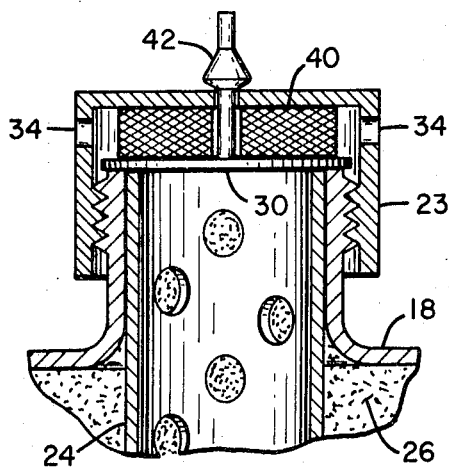

Still another variation is shown in FIG. 5. In FIG. 5 the gasket or sealing means 30 is connected to a stretched rubber stem 42 which extends through the center of a soluble plug 40 and through a small hole in a modified cap 23. The dissolvable plug 40 is again removed by the addition of water. When plug 40 has dissolved the tensioned rubber stem 42 contracts and pulls gasket 30 away from the opening of bottle 18 so as to release acid into the water.

Since numerous variations in the shape of the pellet, cap, and sealing means are possible I do not intend to be bound to the specific embodiment shown but rather only to the reasonable scope of the invention as defined by the appended claims.

I claim:

1. A water-activated acid dispenser for use in water-activated dry-charged batteries comprising:
   an acid-resistant container having two openings, said container being adapted to fit within the battery;
   a water-permeable channel comprising a perforated tube positioned within said container and connected from one opening to the other in said container, said channel operable to provide a relatively large area of contact with said acid and further operable to hold the acid in said container.

2. A water-activated acid dispenser for use in water activated dry charge batteries comprising:
   an acid-resistant container having at least one opening, said container being adapted to fit within the battery;
   acid-resistant sealing means positioned to block the openings in said container;
   water-dissolvable plug means positioned against said sealing means; and
   closure means operable to be fastened to said container and over said plug means so as to press said plug means against said sealing means and seal said container until the addition of water to the battery dissolves said plug means.

3. The apparatus of claim 2 including a water-permeable channel positioned within said container and connected to openings in said container operable to hold the acid in the container while providing a relatively large area of contact with the acid.

4. The apparatus of claim 3 including elastic means connected to said closure means and to said sealing means, under tension, so as to pull said sealing means away from said openings upon the dissolving of said plug means.

5. The apparatus of claim 4 in which said elastic means comprises a tensioned rubber stem extending from said closure means to said sealing means through said plug means.

6. The apparatus of claim 4 in which said elastic means and said sealing means are formed by a rubber loop encircling said closure means and said plug means, said rubber loop having a shaped portion adapted to block the openings in said container.

7. the apparatus of claim 2 in which said container has first and second threaded openings, said sealing means comprises a relatively soft rubber gasket over said openings, said closure means comprises threaded caps designed to screw onto said threaded openings, said threaded caps having water admission holes therein, said permeable channel comprises a perforated tube extending from said first opening to said second opening, and said dissolvable plug means comprise water soluble tablets shaped to fit inside said threaded caps.

8. The apparatus of claim 7 in which said water-soluble tablets are formed from suitable combinations of acid salts and carbonates.

9. The apparatus of claim 7 including elastic means connected to said gasket and to said cap, under tension, operable to pull said gasket away from the openings upon the dissolving of said tablets.

10. The apparatus of claim 9 in which said elastic means comprises tensioned rubber stems extending from said caps to said gaskets through holes in said tablets.

11. The apparatus of claim 9 in which said elastic means and said gaskets are each formed from a rubber loop encircling a cap and its respective tablet, said rubber loop having a shaped portion operable to serve as said gasket.

* * * * *